United States Patent
Smeenge

[19]

[11] Patent Number: 5,804,763
[45] Date of Patent: Sep. 8, 1998

[54] WALL PANEL ASSEMBLY WITH ELECTRICAL OUTLET

[75] Inventor: Paul Allen Smeenge, Ada, Mich.

[73] Assignee: American Seating Company, Grand Rapids, Mich.

[21] Appl. No.: 782,366

[22] Filed: Jan. 13, 1997

[51] Int. Cl.$^6$ .................................................. H02G 3/10
[52] U.S. Cl. .......................... 174/48; 174/58; 52/220.07; 248/906
[58] Field of Search .................. 174/48, 50, 58, 174/49; 248/27.1, 906; 52/220.1, 220.7, 239, 787.1; 220/3.5, 3.6, 3.9; 439/215, 535, 536

[56] References Cited

U.S. PATENT DOCUMENTS

| | | | |
|---|---|---|---|
| 2,042,620 | 6/1936 | Noyes | 174/58 |
| 3,194,361 | 7/1965 | Thurman | 189/34 |
| 4,135,337 | 1/1979 | Medlin | 220/3.3 |
| 4,399,922 | 8/1983 | Horsley | 220/3.9 X |
| 4,403,708 | 9/1983 | Smolik | 220/3.5 |
| 4,446,663 | 5/1984 | Stumpf et al. | 52/239 X |
| 4,483,453 | 11/1984 | Smolik | 220/3.5 |
| 4,576,302 | 3/1986 | Smolik | 220/3.5 |
| 4,682,457 | 7/1987 | Spencer | 52/239 |
| 4,874,322 | 10/1989 | Dola et al. | 439/210 |
| 4,964,525 | 10/1990 | Coffey et al. | 248/906 X |
| 5,038,539 | 8/1991 | Kelley et al. | 52/239 |
| 5,064,386 | 11/1991 | Dale et al. | 439/535 |
| 5,263,676 | 11/1993 | Medlin, Jr. et al. | 220/3.6 X |
| 5,362,923 | 11/1994 | Newhouse et al. | 174/48 |
| 5,444,955 | 8/1995 | Ou | 52/220.7 X |
| 5,448,011 | 9/1995 | Laughlin | 174/48 |

FOREIGN PATENT DOCUMENTS

1159189  7/1969  United Kingdom ................. 174/48 X

*Primary Examiner*—Dean A. Reichard
*Attorney, Agent, or Firm*—Young & Basile, P.C.

[57] ABSTRACT

A method and apparatus for installing electrical outlets in a wall panel assembly. The wall panel includes an open frame structure and front and rear panel inserts removably attached to front and rear faces of the frame structure. The rear panel insert is removed from the rear face of the frame structure, a cutout is formed in the front panel insert at a desired location for the outlet, a bracket is secured at one end thereof to the frame structure with another end thereof positioned proximate the cutout in the front panel insert, the outlet is positioned in the cutout in the front panel insert and secured to the other end of the bracket, and the rear panel is replaced against the rear face of the frame structure.

4 Claims, 7 Drawing Sheets

FIG-24

WALL PANEL ASSEMBLY WITH ELECTRICAL OUTLET

BACKGROUND OF THE INVENTION

This invention relates to wall panel assemblies and more particularly to a method and apparatus for mounting electrical outlets in a wall panel assembly.

Separate or modular wall panels have particular utility in "open plan" offices. Open plan systems do not use conventional floor to ceiling walls to separate rooms but, rather, individual wall panels are selectively ganged together to define desired areas. The height of the wall panels may vary, for example, in the range of 5 to 7 feet and the width may vary in the range of 18 to 48 inches. Such panels need not be secured to the floor and typically terminate short of the ceiling.

Open plan office systems have received increased acceptance during recent years because of the ease of construction, relatively low cost, and flexibility. Whereas existing wall panel designs are generally satisfactory, the structure of the existing wall panel assemblies inherently severely limits the location on the panel assembly at which electrical outlets, either power or telecommunications, may be provided.

SUMMARY OF THE INVENTION

This invention is directed to the provision of a wall panel assembly construction offering a wide range of choices for the location of electrical outlets in the panel.

The invention relates to wall panels of the type including an open frame structure defined by a plurality of frame members arranged in a polygonal configuration and front and rear panel inserts removably secured to front and rear faces of the frame structure.

According to the invention, the front panel insert defines a cutout and the assembly includes a bracket secured at one end thereof to a frame member and an electrical outlet connected to another end of the bracket and positioned in the cutout. This construction enables an electrical outlet to be positioned at any location in the panel.

According to a further feature of the invention, the front panel insert has a laminar construction including a relatively rigid board and a layer of relatively loose insulation material at the rear face of the board, and the other end of the bracket is positioned against the rear face of the board in a cutout in the loose insulation material. This arrangement allows the bracket to be securely positioned against the rigid board so as to provide a firm mounting for the electrical outlet.

According to a further feature of the invention, the other end of the bracket defines an opening; the panel assembly further includes an adapter plate extending through the bracket opening and positioned in a cutout in the board; the adapter plate includes an opening; the laminar panel construction further includes a fabric covering the front face of the board, and the fabric has a cutout generally corresponding in size and configuration to the adapter plate opening. With this arrangement, the outlet may be secured to the bracket with a socket member defined by the outlet positioned in the fabric cutout so as to be accessible from the front face of the front panel insert by an electric plug.

The invention methodology provides a method of providing an electrical outlet in a wall panel of the type including an open frame structure defined by a plurality of frame members arranged in a polygonal configuration and front and rear panel inserts removably attached to front and rear faces of the frame structure.

According to the invention methodology, the rear panel insert is removed from the rear face of the frame structure; a cutout is formed in the front panel insert at a desired location for the outlet; a bracket is provided having a frame structure mounting portion and an outlet mounting portion; the frame structure mounting portion of the bracket is secured to one of the frame members while positioning the outlet mounting portion of the bracket rearwardly of the front panel insert and proximate the cutout; the electrical outlet is connected to the outlet mounting portion of the bracket with the outlet positioned at least partially in the cutout; and the rear panel insert is replaced on the rear face of the frame structure. This methodology allows an outlet to be readily provided at virtually any location on the panel.

According to a further feature of the invention methodology, the front panel insert has a laminar construction including a relatively rigid board and a layer of relatively loose insulation material; the step of forming a cutout in the front panel insert includes forming a cutout in the loose insulation material large enough to accommodate the outlet mounting portion of the bracket; and the step of positioning the outlet mounting portion of the bracket proximate the cutout comprises positioning the outlet mounting portion of the bracket against the rigid board and within the cutout in the loose insulation material. This methodology allows the outlet mounting portion of the bracket to be firmly positioned against the rear face of the rigid board so as to provide a firm mounting for the outlet.

According to a further feature of the invention methodology, the outlet mounting portion of the bracket defines an opening; the step of forming a cutout in the front panel insert further includes forming a cutout in the board generally corresponding to the opening in the outlet mounting portion of the bracket; the method includes the further step of providing an adapter plate and passing the adapter plate through the opening in the outlet mounting portion of the bracket to position a front mounting plate portion of the adapter plate in the cutout in the board; the laminar construction of the front panel insert further includes a fabric layer covering the front face of the board; the front mounting plate portion of the adapter plate defines an opening; and the step of forming a cutout in the front panel insert further includes forming a cutout in the fabric layer generally corresponding to the opening in the front mounting plate portion of the adapter plate. With this methodology, the outlet may be mounted on the outlet mounting portion of the bracket with a socket member forming a portion of the outlet positioned in the fabric cutout for access from the front face of the front panel insert by an electric plug.

DETAILED DESCRIPTION OF THE PREFERRED EMBODIMENT

Figure 1:
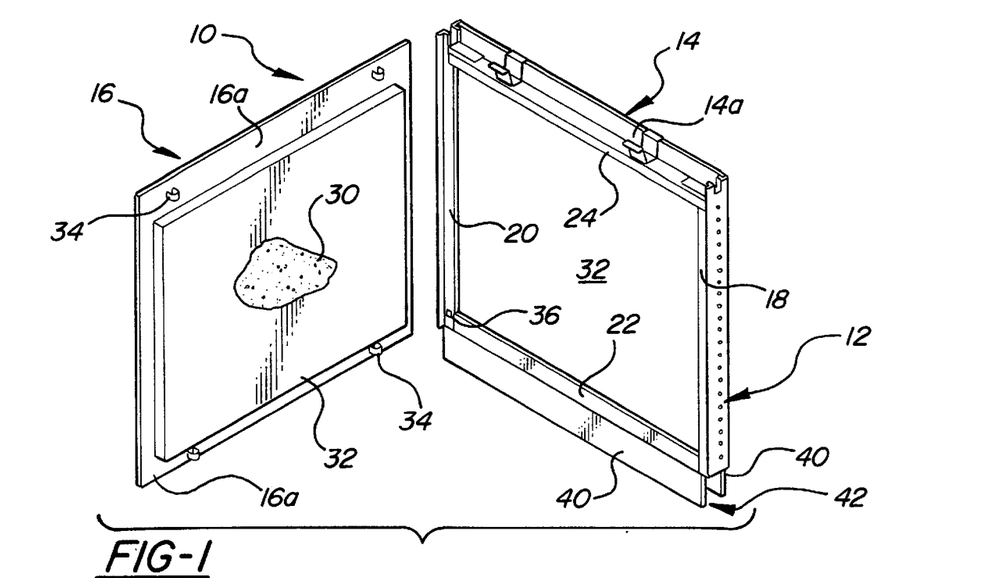
FIG. 1 is an exploded perspective view of a wall panel assembly, of the type utilized in the invention.
Figure 6:
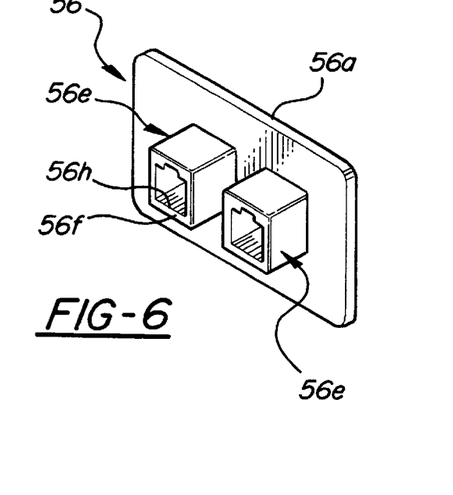
FIGS. 6 and 7 are perspective views of a telecommunications outlet.
Figure 7:
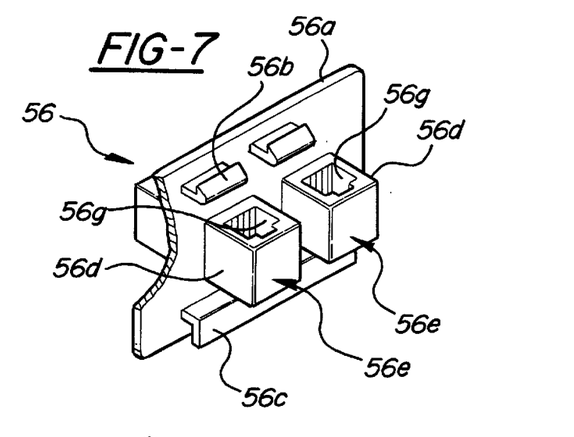
Figure 27:
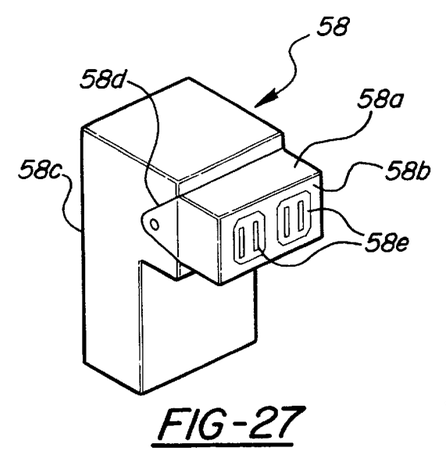
FIG. 27 is a perspective view of a power outlet.
Figure 29:
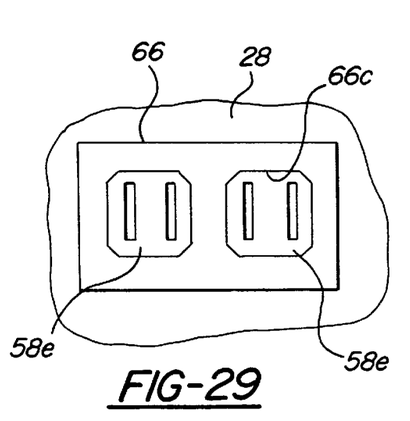
FIG. 29 is a fragmentary view looking in the direction of the arrow 29 in FIG. 28.

The invention is intended for use with a wall panel assembly 10 of the general type seen in FIG. 1 and is intended to provide an apparatus and methodology for mounting either the telecommunications electrical outlet of FIGS. 6 and 7 or the power electrical outlet of FIG. 27 and 29 at any desired location on the panel assembly.

Wall panel assembly 10, broadly considered, includes an open frame structure 12, a front panel insert 14, and a rear panel insert 16.

Figure 8:
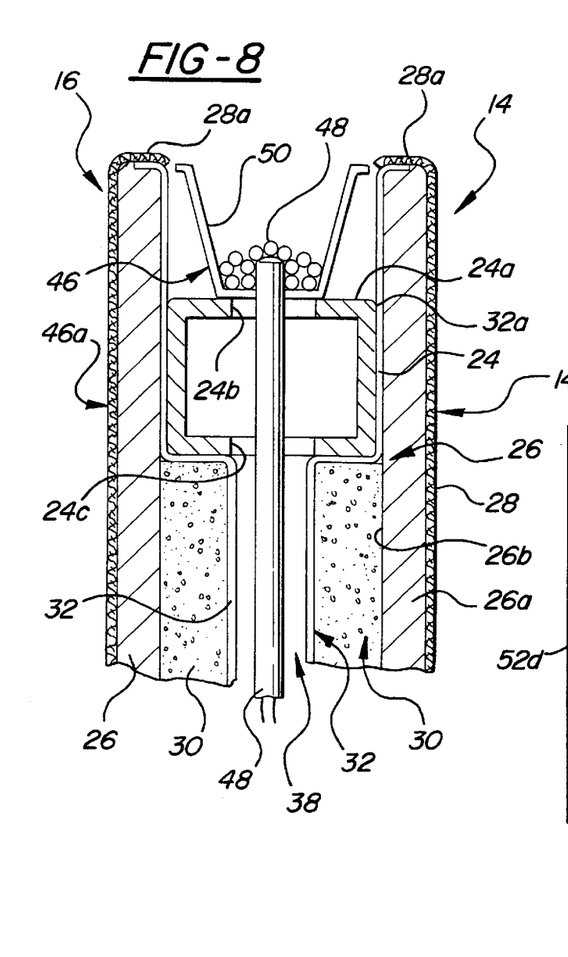
FIG. 8 is a fragmentary cross-sectional view of the wall panel assembly.

Open frame structure 12 includes side frame members 18 and 20, a bottom frame member 22, and a top frame member 24 arranged in a rectangular configuration and suitably welded together. Each of the frame members preferably has a tubular cross-sectional configuration (FIG. 8).

Front panel insert 14 has a rectangular configuration generally conforming to the rectangular configuration of the frame structure and has a laminar cross-sectional construction.

Figure 2:
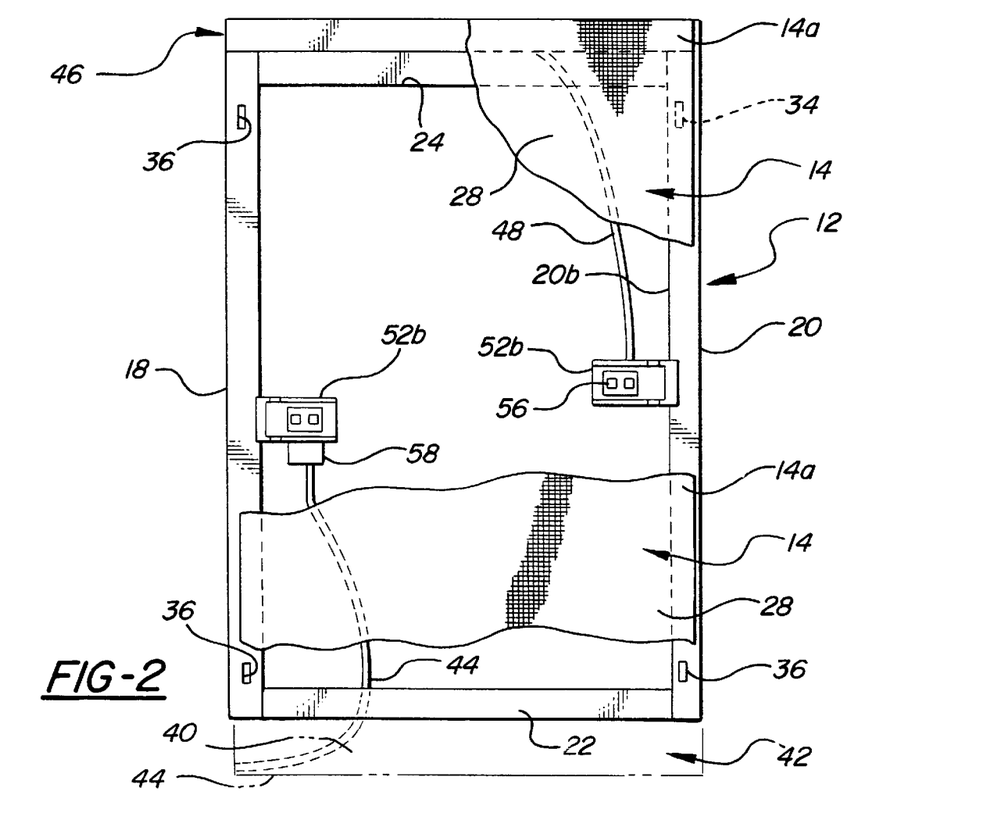
FIG. 2 is a somewhat schematic front view of the wall panel assembly.

Specifically, front panel insert 14 (FIGS. 1, 2 and 8) includes a relatively rigid fiberglass board 26; a fabric covering or layer 28 positioned against the front face 26a of the board and secured to the board as by edge portions 28a wrapping around the upper, lower and side edges of the board; relatively loose insulation material 30 such, for example, as fiberglass; and a foil layer 32 capturing the insulation 30 and positioning the insulation against the rear face 26b of the board. The foil/loose insulation composite 32/30 has a lesser rectangular configuration than the board 26 so as to define peripheral flange portions 14a of the front panel insert. The foil layer 32 may include a peripheral portion 32a extending around the upper, lower and side edges of board 26.

The lesser rectangular composite 30/32 is sized to fit within the open frame structure 12 with the flange portions 16a positioned against the front faces of the frame members and the flange portion 16a at the top of the panel extending upwardly beyond the top face 24a of the frame member 24.

Front panel insert 14 is removably secured to the front face of the frame structure 12 by, for example, clips 34 provided at circumferentially spaced locations on the flange portions 16a and coacting with apertures 36 in the frame structure.

Rear panel insert 16 is identical to front panel insert 14 and includes a rigid fiberglass board 26, a fabric covering 28, a layer of loose insulation 30, and a foil layer 32, all arranged and interrelated in the manner described with respect to front insert panel 14. With front panel insert 14 snappingly secured to the front face of the frame structure and rear panel insert 16 snappingly secured to the rear face of the frame structure, a space 38 is defined between the confronting foil layers 32 of the front and rear panel inserts.

The panel assembly further includes front and rear lower face plates 40 positioned at the bottom of the lower frame member 22 and defining a lower raceway 42 for receipt of power cables 44. The panel assembly further defines an upper raceway 46 for receipt of telecommunications cables 48. Raceway 46 is defined by the upper face 24a of upper frame member 24 and by upper edge portions of panel flanges 14a and 16a. A top or cover (not shown) is secured in overlying relation to the upper raceway utilizing clips 50 secured to the upper face 24a of upper frame member 24.

The panel construction thus far described is conventional.

According to the invention, an apparatus and methodology are provided whereby a power outlet or a telecommunications outlet may be provided at a wide variety of locations on the front panel 16 for connection to telecommunications cables 48 or power cables 44.

The invention apparatus includes a bracket 52 and an adapter plate 54.

Bracket 52 (FIGS. 3 and 4) is formed preferably of a suitable ferrous material in a stamping and welding operation and includes a frame structure mounting portion 52a at one end of the bracket, an outlet mounting portion 52b at the other end of the bracket, and an intermediate portion 52c interconnecting the ends 52a and 52b.

Figure 3:
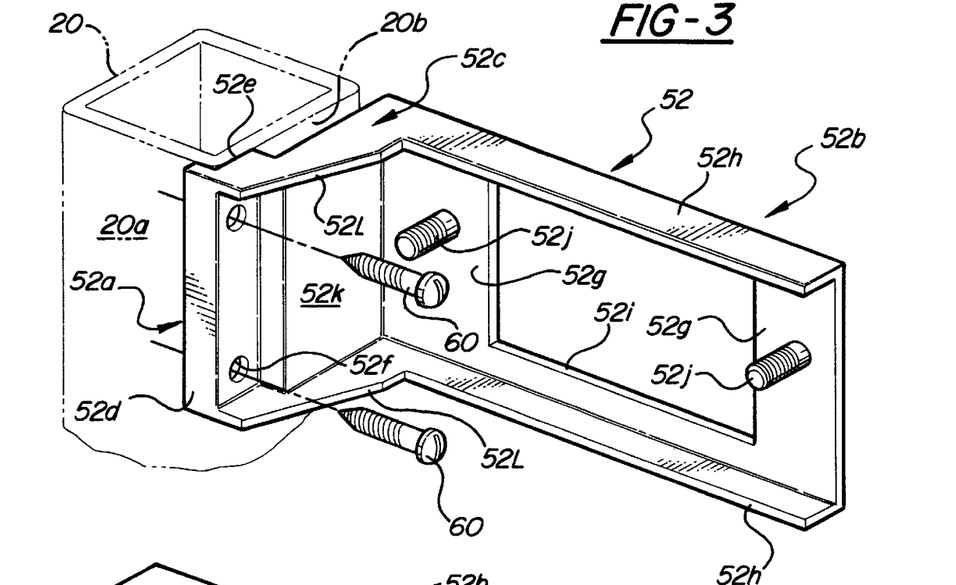
FIGS. 3 and 4 are perspective views of a bracket utilized in the invention.
Figures 4, 5:
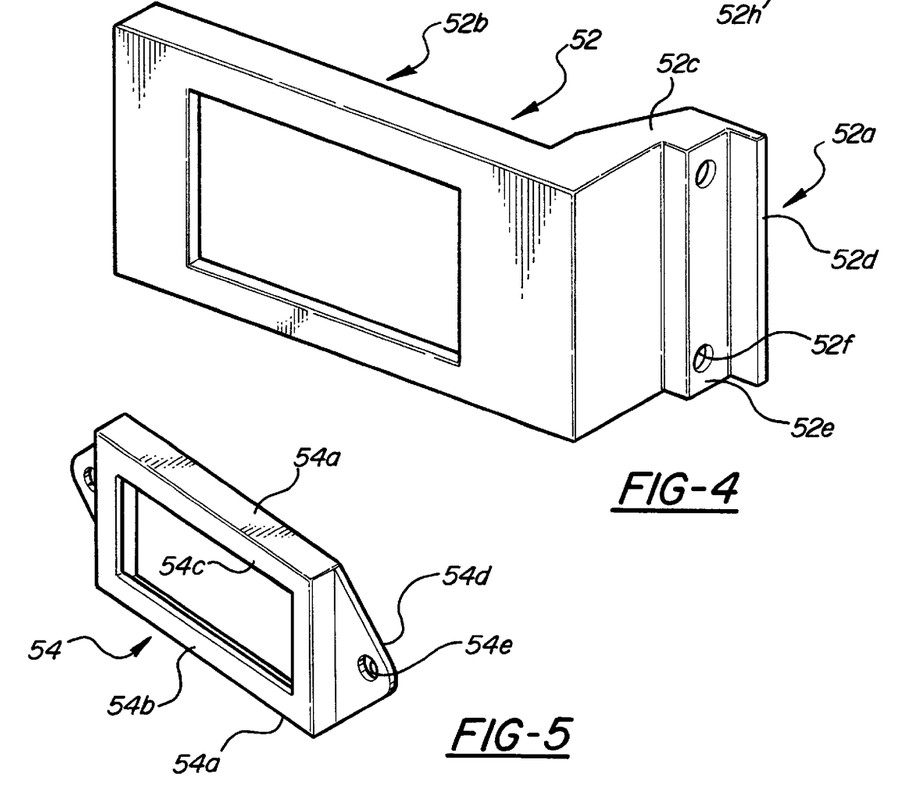
FIG. 5 is a perspective view of an adapter plate utilized in the invention.

Frame structure mounting portion 52a includes a positioning flange portion 52d and a mounting plate portion 52e defining mounting holes 52f.

Outlet mounting portion 52b has a generally planar configuration and includes a planar main body portion 52g, upper and lower flange portions 52h, a rectangular aperture or opening 52i defined in planar main body portion 52g, and threaded studs 52j fixedly secured to and projecting rearwardly from main body portion 52g at opposite sides of opening 52i.

Intermediate portion 52c includes an end wall portion 52k and flange or buttress portions 52l extending between frame structure mounting end 52a and flange portions 52h.

Adapter plate 54 (FIG. 5) is also preferably formed of a suitable ferrous material in a stamping operation and has a generally U shaped configuration in cross-section. Adapter plate 54 includes upper and lower flange portions 54a, a front mounting plate portion 54b defining a generally rectangular opening 54c, and left and right mounting flange portions 54d defining mounting apertures 54e.

Bracket 52 and adapter plate 54 may be utilized to mount either a telecommunications outlet or module 56 (FIGS. 6 and 7) or a power outlet 58 (FIG. 27) at a desired location in the panel assembly. The mounting of the telecommunications module 56 in the panel assembly is illustrated in the sequential perspective views of FIGS. 1 and 9–17 and in the cross-sectional views of FIGS. 18–26, corresponding respectively to the perspective views of FIGS. 9–17. The mounting of power module 29 in the panel assembly is illustrated in FIGS. 28 and 29.

Figures 9, 10:
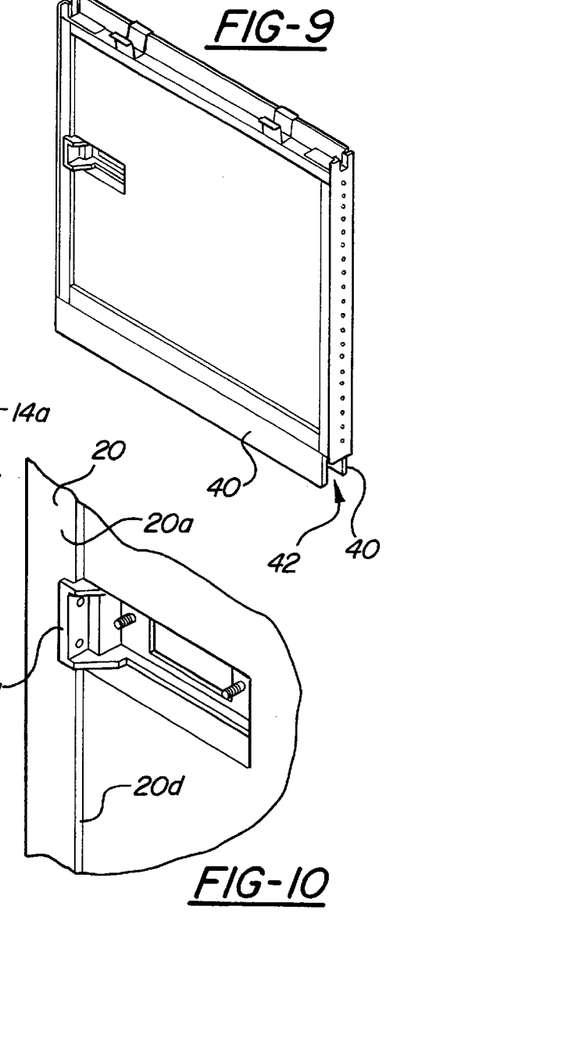
FIGS. 9–17 are progressive perspective views showing the operation of the invention methodology to install a telecommunications outlet in the wall panel assembly.
Figures 11, 12, 13:
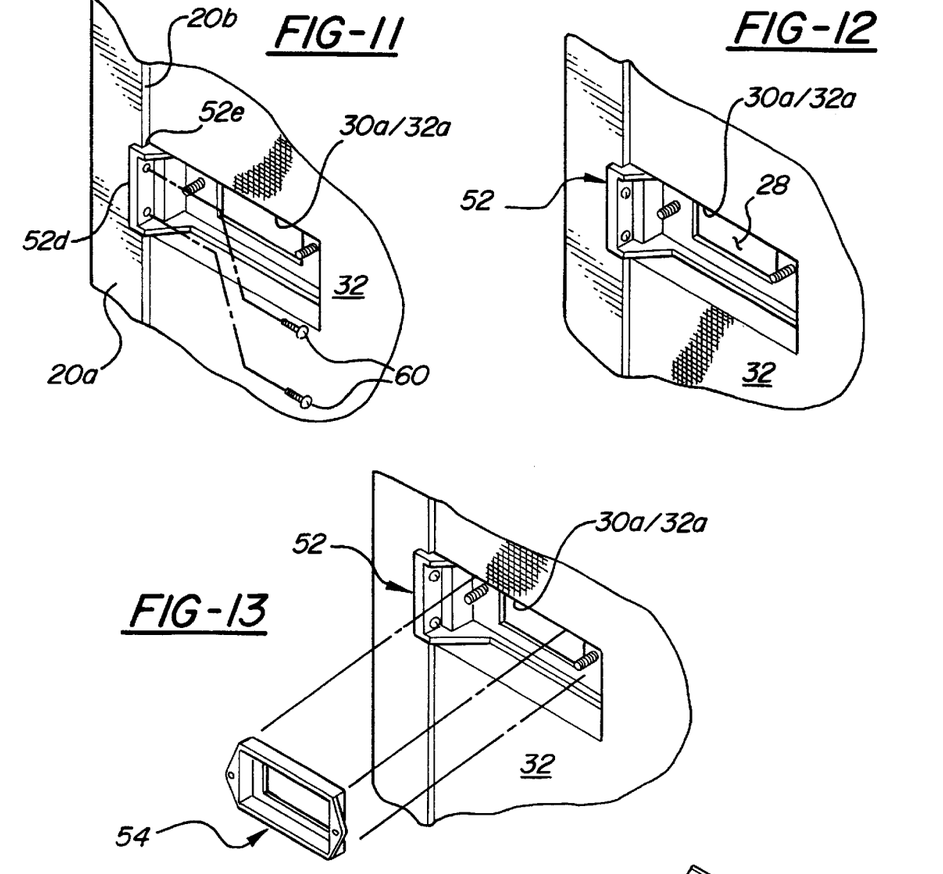
Figures 16, 17:
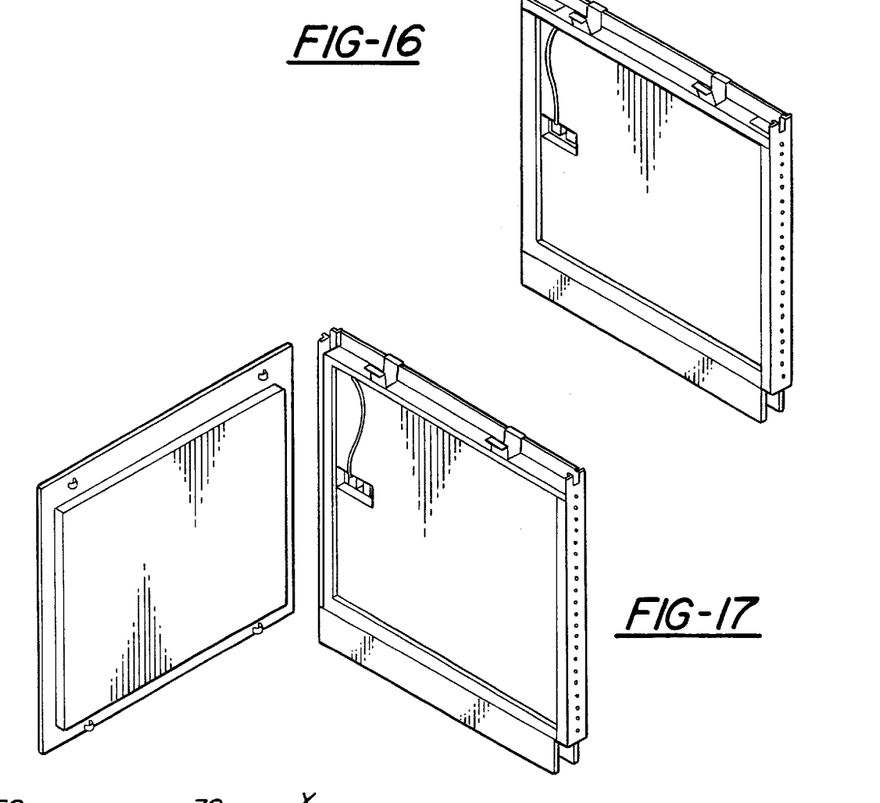
Figure 18:
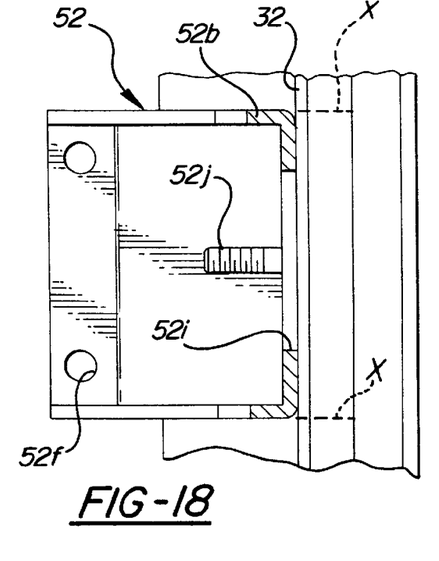
FIGS. 18–26 are progressive fragmentary cross-sectional views corresponding respectively to perspective views 9–17.
Figure 19:
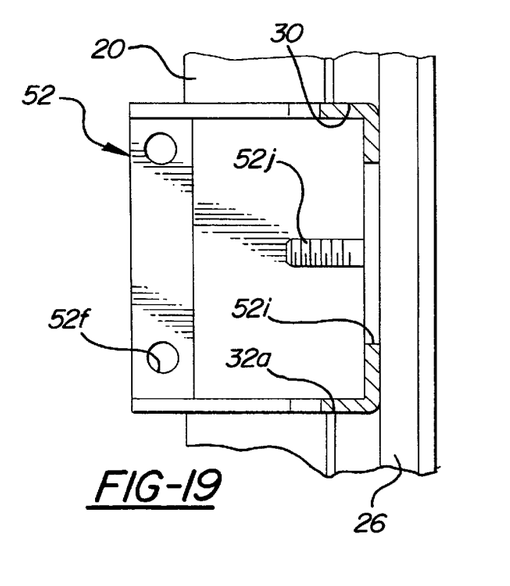
Figure 20:
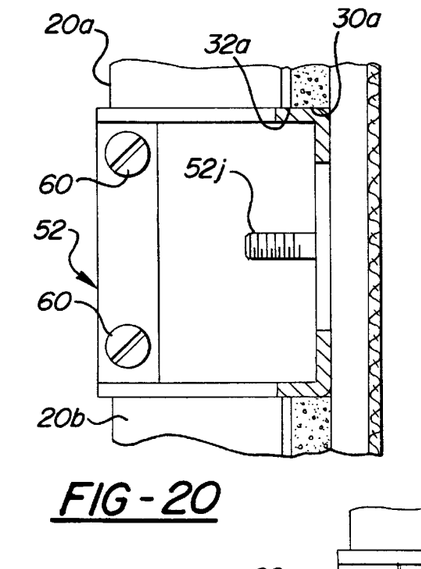
Figure 21:
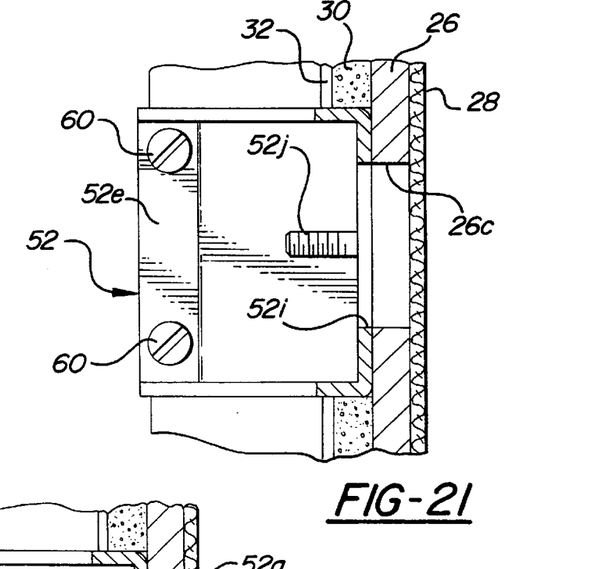
Figure 22:
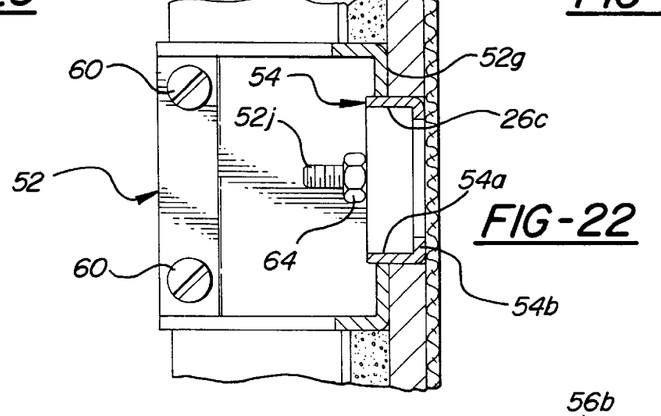
Figure 23:
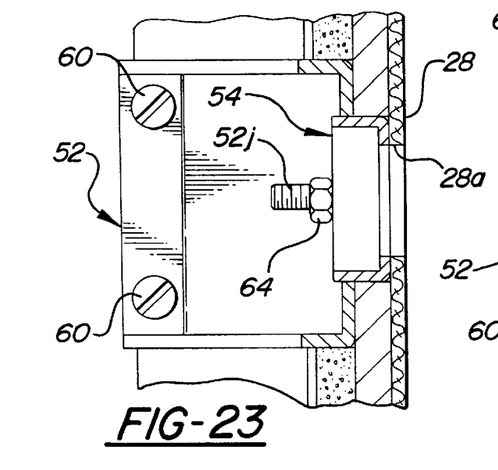
Figure 24:
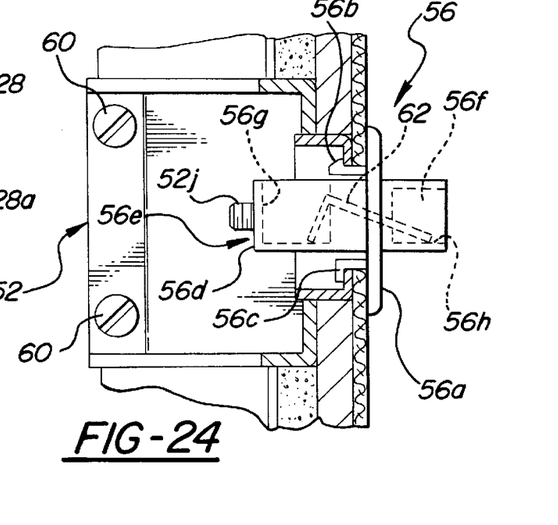
Figure 25:
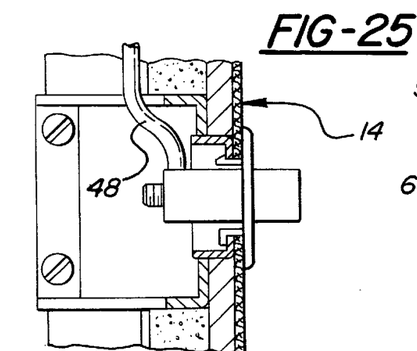
Figure 26:
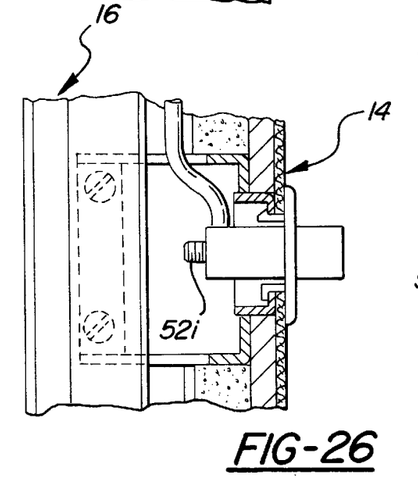

With reference to the perspective views of FIGS. 1 and 9–17, and the corresponding cross-sectional views of FIGS. 18–26, after a desired location has been determined for a telecommunications outlet (for example as seen in FIG. 9, midway between upper and lower frame members 22 and 24 and proximate side frame member 20), rear panel 16 is removed from the rear face of the frame assembly by disengagement of clips 34 from apertures 36 (FIG. 1) to expose the rear face of front panel insert 14; the outlet mounting portion 52b of bracket 52 is positioned against the rear face of the front panel insert at the desired outlet location with the frame structure mounting portion 52c positioned proximate side frame member (FIGS. 9 and 18); the insulation material layer 32 and loose foil 30 are cut around the perimeter of outlet mounting portion 52b along dash line X; the loose foil and fiberglass are removed to expose the rear face of the board 26 whereafter the outlet mounting portion 52b of the bracket is positioned against the rear face 26b of board 26 within the cutout 32a/30a in the foil and loose fiberglass (FIGS. 10 and 19); the frame structure mounting portion of the bracket is fixedly mounted to frame member 20 utilizing self drilling screws 60 passing through mounting apertures 52f with bracket flange portion 52d positioned against the rear face 20a of the frame member and mounting plate portion 52e positioned against the inboard face 20b of the frame member (FIGS. 11 and 20); board 26 is cut along the rectangular configuration of the bracket opening 52i to form a rectangular cutout 26c in the board while being careful not to cut the fabric 28 (FIGS. 12 and 21); adapter plate 54 is positioned in the rectangular opening 52i of the bracket to position front mounting plate portion 54b against the rear face of the fabric, position flange portions 54a in the cutout 26c in the board, and position mounting flange portions 54d over studs 52j utilizing mounting apertures 54e whereafter the adapter plate is secured by nuts 64 threaded onto studs 52j (FIGS. 13 and 22); fabric 28 is cut along the rectangular configuration of adapter plate opening 54c to form a rectangular cutout 28a in the fabric corresponding to adapter plate opening 54c (FIGS. 14 and 23); a telecommunications module 56 is installed from the front face of the front panel insert by snappingly securing a face plate 56a of the module against the outer face of the fabric utilizing upper and lower fastener members 56b and 56c coacting with the front mounting plate portion 54b of adapter plate 54, whereby to position receptacle portions 56d of connectors 56e in the panel cutout rearwardly of the face plate and position socket portions 56f of connectors 56e forwardly of the face plate and forwardly of the panel (FIGS. 15 and 24); telecommunications cables 48 are routed downwardly from raceway 46 through aligned upper and lower apertures 24b and 24c in upper frame member 24 (FIG. 8) and connectors provided on the lower ends of the cables are positioned in known manner within the receptacles 56g defined by the respective receptacle portions 56d of the connectors 56e (FIGS. 16 and 25); and the rear panel insert is reinstalled against the rear face of the panel frame structure utilizing clips 34 and apertures 36 (FIGS. 17 and 26).

The telecommunications module 56 has now been installed in the front panel insert of the panel assembly at the desired location and is ready for use. It will be understood that, in use, connectors on the free ends of leads associated with telecommunications equipment are inserted into sockets 56h defined by the socket portions 56f of the connectors 56e for electrical connection with the connectors positioned in the receptacles 56g via contacts 62 suitably interconnecting receptacles 56g and sockets 56h.

Figure 14:
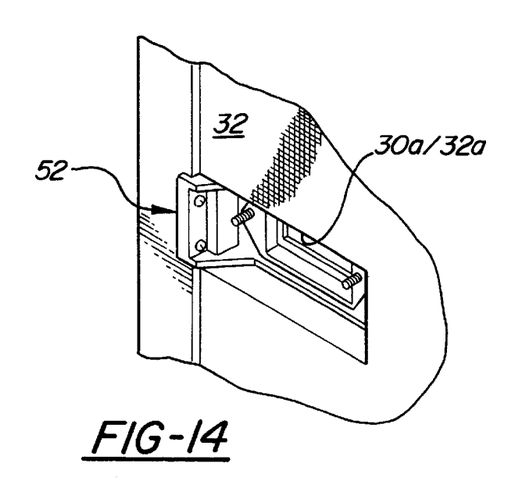
Figure 15:
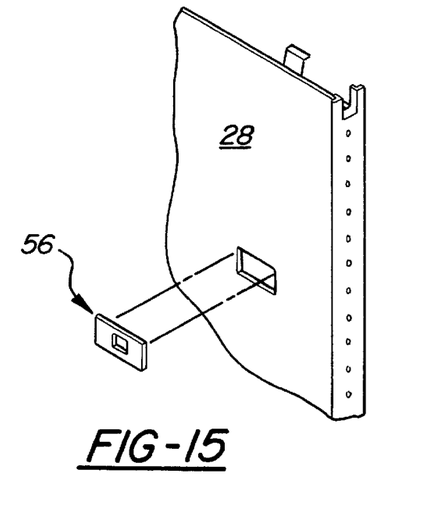
Figure 28:
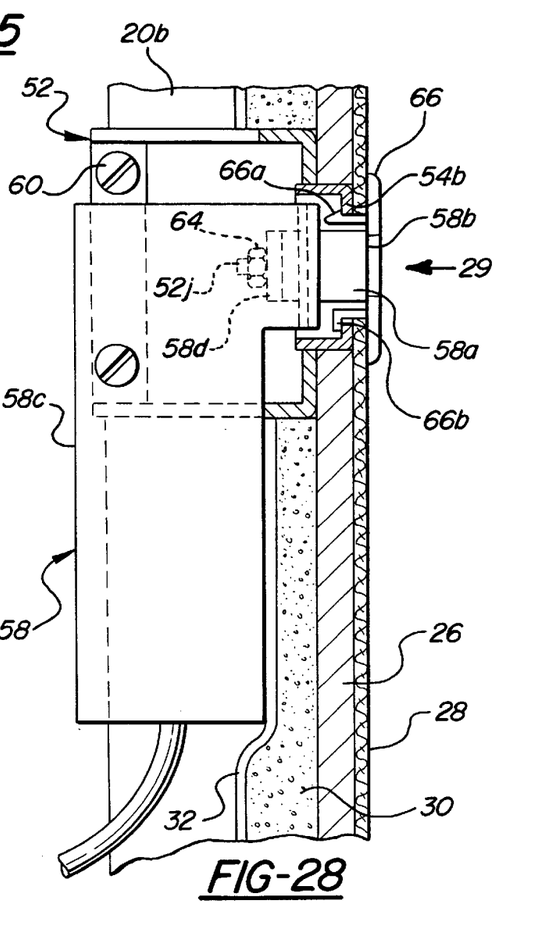
FIG. 28 is a cross-sectional view showing the installation of the power outlet of FIG. 27 in the panel assembly according to the invention methodology.

When it is desired to install a power outlet 58 in the front panel insert, the above described procedure is followed through the fabric cutting step seen in FIGS. 14 and 25 whereafter (as seen in FIGS. 28 and 29) a power outlet 58 is inserted from the back side of the panel to position a socket portion 58a of the outlet within the cutouts in the board and fabric with the front face 58b of the socket portion positioned substantially flush with the front face of the panel assembly, the lower connector portion 58c of the outlet pressing against the foil 32 and insulation 30 below the cutout to compress the insulation as necessary, and lugs 58d on either side of the outlet receiving bracket studs 52j. The outlet is fixed in position relative to the panel utilizing nuts 64 threadably engaging studs 52j. A face plate 66 may now be installed from the front face of the panel utilizing coacting snap fastener portions 66a and 66b coacting with the front mounting plate portion 54b of the adapter plate. Face plate 66 has suitable openings 66c which selectively surround and expose sockets 58e defined at the front face of socket portion 58a of outlet 58. Power cables 44 may now be routed upwardly from raceway 42 through suitable apertures in lower frame member 22 for connection to the lower end of outlet connector portion 58c in known manner, whereafter the rear panel insert may be reinstalled against the rear face of the frame structure. Sockets 58e function in known manner to receive the plugs of power cords associated with various items of electrical equipment so as to selectively provide power to this equipment.

Outlets may be installed according to the invention apparatus and methodology at virtually any location on the panel assembly utilizing brackets of varying lengths mounted on and extending from a selected one of frame members 18, 20, 22, and 24. The apparatus and methodology of the invention will thus be seen to provide a ready and convenient means for providing electrical outlets at virtually any desired location on a wall panel assembly. The invention will further be seen to provide the virtually unlimited choice of outlet location utilizing a minimum of hardware and requiring a minimum of time and labor.

Whereas a preferred embodiment of the invention has been illustrated and described in detail, it will be apparent that various changes may be made in the disclosed embodiment without departing from the scope or spirit of the invention.

I claim:

1. A wall panel assembly comprising:

an open frame structure defined by four frame members arranged in a rectangular configuration including two vertical side frame members;

a front panel insert removably secured to a front face of the frame structure and defining a cutout;

a rear panel insert removably secured to a rear face of the frame structure;

a bracket secured at one end thereof to one fame member of said frame members;

an electrical outlet connected to another end of the bracket and positioned in the cutout;

the front panel insert having a laminar construction including a relatively rigid board and a layer of relatively loose insulation material at a rear face of the board;

the cutout in the front panel insert extending through the board and through the loose insulation material;

the other end of the bracket being positioned against the rear face of the board in the cutout in the loose insulation material and defining an opening;

the panel assembly further including an adaptor plate extending through the bracket opening, positioned in the cutout in the board, and including and opening;

the laminar panel construction further including a fabric covering a front face of the board; and the fabric having a cutout generally corresponding in size and configuration to the adaptor plate opening.

2. A panel assembly according to claim 1 wherein the outlet includes a socket member positioned in the fabric cutout and accessible from a front face of the front panel insert by an electric plug.

3. A method of providing an electrical outlet in a wall panel of a type including an open frame structure defined by a plurality of frame members arranged in a polygonal configuration and front and rear panel inserts removably attached to front and rear faces of the frame structure, the method comprising:

removing the rear panel insert from the rear face of the frame structure;

forming a cutout in the front panel insert at a deserted location for the outlet;

providing a bracket having a frame structure mounting portion and an outlet mounting portion defining an opening;

securing the frame structure mounting portion of the bracket to one of the frame members while positioning the outlet mounting portion of the bracket rearwardly of the front panel insert and proximate the cutout;

connecting the electrical outlet to the outlet mounting portion of the bracket with the outlet positioned at least partially in the cutout; and replacing the rear panel insert on the rear face of the frame structure;

the front panel insert having a laminar construction including a relatively rigid board and a layer of relatively loose insulation material and a fabric layer covering a front face of the board;

the step of forming a cutout in the front panel insert including forming a cutout in the loose insulation material large enough to accommodate the outlet mounting portion of the bracket and forming a cutout in the board generally corresponding to the opening in the outlet mounting portion of the bracket;

the step of positioning the outlet mounting portion of the bracket proximate the cutout comprising positioning the outlet mounting portion of the bracket against the rigid board and within the cutout and the loose insulation material;

the method including the further steps of providing an adaptor plate and passing the adaptor plate through the opening in the outlet mounting portion of the bracket to position a front mounting plate portion of the adaptor plate in the cutout in the board;

the front mounting plate portion of the adaptor plate defining an opening; and the step of forming a cutout in the front panel insert further including forming a cutout in the fabric layer generally corresponding to the opening in the front mounting plate portion of the adaptor plate.

4. A method according to claim 3 wherein:

the outlet includes a socket member; and the method includes positioning the socket member in the fabric cutout for access from a front face of the front panel insert by an electric plug.

* * * * *